United States Patent
Wagner et al.

(10) Patent No.: US 12,365,100 B2
(45) Date of Patent: Jul. 22, 2025

(54) SYSTEMS AND METHODS FOR PROVIDING DYNAMIC VACUUM PRESSURE AT AN END EFFECTOR USING A SINGLE VACUUM SOURCE

(71) Applicant: Berkshire Grey Operating Company, Inc., Bedford, MA (US)

(72) Inventors: Thomas Wagner, Concord, MA (US); Kevin Ahearn, Nebo, NC (US); John Richard Amend, Jr., Arlington, MA (US); Benjamin Cohen, White Plains, NY (US); Michael Dawson-Haggerty, Pittsburgh, PA (US); William Hartman Fort, Stratham, NH (US); Christopher Geyer, Arlington, MA (US); Jennifer Eileen King, Gibsonia, PA (US); Thomas Koletschka, Somerville, MA (US); Michael Cap Koval, Mountain View, CA (US); Kyle Maroney, Saunderstown, RI (US); Matthew T. Mason, Atlanta, GA (US); William Chu-Hyon McMahan, North Cambridge, MA (US); Gene Temple Price, Somerville, MA (US); Joseph Romano, Arlington, MA (US); Daniel Smith, Wexford, PA (US); Siddhartha Srinivasa, Seattle, WA (US); Prasanna Velagapudi, Pittsburgh, PA (US); Thomas Allen, Reading, MA (US)

(73) Assignee: Berkshire Grey Operating Company, Inc., Bedford, MA (US)

(*) Notice: Subject to any disclaimer, the term of this patent is extended or adjusted under 35 U.S.C. 154(b) by 485 days.

(21) Appl. No.: 17/848,199

(22) Filed: Jun. 23, 2022

(65) Prior Publication Data

US 2022/0314459 A1    Oct. 6, 2022

Related U.S. Application Data

(63) Continuation of application No. 17/011,393, filed on Sep. 3, 2020, now Pat. No. 11,426,881, which is a
(Continued)

(51) Int. Cl.
| | | |
|---|---|---|
| *B25J 15/06* | (2006.01) | |
| *B65G 47/91* | (2006.01) | |
| *B66C 1/02* | (2006.01) | |

(52) U.S. Cl.
CPC ......... *B25J 15/0625* (2013.01); *B25J 15/065* (2013.01); *B66C 1/02* (2013.01);
(Continued)

(58) Field of Classification Search
CPC .. B25J 15/0625; B25J 15/065; B25J 15/0658; B66C 1/02; B66C 1/0218; B66C 1/0256; B65G 47/91; B65G 47/917
See application file for complete search history.

(56) References Cited

U.S. PATENT DOCUMENTS

| | | |
|---|---|---|
| 2,853,333 A | 9/1958 | Littell |
| 3,005,652 A | 10/1961 | Helm |

(Continued)

FOREIGN PATENT DOCUMENTS

| | | |
|---|---|---|
| CA | 2998128 A1 | 3/2017 |
| CA | 3080961 C | 10/2023 |

(Continued)

OTHER PUBLICATIONS

Anver Corporation: Vacuum Tube Lifting Systems, Nov. 22, 2004, XP55585132, retrieved from the Internet: URL:http://www.jrgindustries.com/assets/anver.pdf, retrieved on May 2, 2019.
(Continued)

*Primary Examiner* — James R Bidwell
(74) *Attorney, Agent, or Firm* — Gesmer Updegrove LLP

(57) ABSTRACT

A system including a programmable motion device and an end effector for grasping objects to be moved by the pro-
(Continued)

grammable motion device is disclosed. The system includes a vacuum source that provides a high flow vacuum such that an object may be grasped at an end effector opening while permitting a substantial flow of air through the opening, and a dead-head limitation system for limiting any effects of dead-heading on the vacuum source in the event that a flow of air to the vacuum source is interrupted.

30 Claims, 13 Drawing Sheets

Related U.S. Application Data continuation of application No. 16/182,007, filed on Nov. 6, 2018, now Pat. No. 10,814,498.

(60) Provisional application No. 62/582,651, filed on Nov. 7, 2017.

(52) U.S. Cl.
CPC .......... *B66C 1/0218* (2013.01); *B66C 1/0256* (2013.01); *B65G 47/91* (2013.01); *B65G 47/917* (2013.01)

(56) References Cited

U.S. PATENT DOCUMENTS

| | | | |
|---|---|---|---|
| 3,181,563 A | 12/1961 | Giffen | |
| 3,195,941 A | 7/1965 | Morey | |
| 3,637,249 A | 1/1972 | Kuhl et al. | |
| 3,743,340 A | 7/1973 | Williamann | |
| 3,959,864 A | 6/1976 | Tell | |
| 4,340,234 A | 7/1982 | Ise | |
| 4,389,064 A | 6/1983 | Laverriere | |
| 4,412,775 A | 11/1983 | Molitor et al. | |
| 4,466,778 A | 8/1984 | Volkmann | |
| 4,495,968 A | 1/1985 | Kist | |
| 4,557,659 A | 12/1985 | Scaglia | |
| 4,561,688 A | 12/1985 | Tsutsui | |
| 4,828,304 A | 5/1989 | No et al. | |
| 4,960,364 A | 10/1990 | Tell | |
| 5,024,575 A | 6/1991 | Anderson | |
| 5,035,456 A | 7/1991 | Mesinger | |
| 5,207,465 A | 5/1993 | Rich | |
| 5,344,202 A * | 9/1994 | Ramler | B65G 47/91 294/188 |
| 5,683,227 A | 11/1997 | Nagai et al. | |
| 5,752,729 A | 5/1998 | Crozier et al. | |
| 5,791,861 A | 8/1998 | Seelig | |
| 5,865,487 A | 2/1999 | Gore et al. | |
| 6,244,640 B1 | 6/2001 | Le Bricquer et al. | |
| 6,397,876 B1 | 6/2002 | Golden et al. | |
| 6,817,639 B2 | 11/2004 | Schmalz et al. | |
| 7,017,961 B1 | 3/2006 | Parnell et al. | |
| 7,140,389 B2 | 11/2006 | Schnatterer et al. | |
| 7,263,890 B2 | 9/2007 | Takahashi | |
| 7,618,074 B2 | 11/2009 | Zimmer | |
| 7,637,548 B2 | 12/2009 | Fukano et al. | |
| 7,677,622 B2 | 3/2010 | Dunkmann et al. | |
| 8,070,203 B2 | 12/2011 | Schaumberger | |
| 8,096,598 B2 | 1/2012 | Perlman | |
| 8,267,386 B2 | 9/2012 | Schaaf et al. | |
| 8,662,861 B2 | 3/2014 | Tell | |
| 8,777,284 B2 | 7/2014 | Schaller et al. | |
| 9,061,868 B1 | 6/2015 | Paulsen et al. | |
| 9,656,813 B2 | 5/2017 | Dunkmann et al. | |
| 9,707,686 B2 | 7/2017 | Dunkmann et al. | |
| 9,999,977 B2 | 6/2018 | Wagner et al. | |
| 10,118,300 B2 | 11/2018 | Wagner et al. | |
| 10,814,498 B2 | 10/2020 | Wagner et al. | |
| 11,426,881 B2 * | 8/2022 | Wagner | B25J 15/0625 |
| 2001/0045755 A1 | 11/2001 | Schick et al. | |
| 2003/0038491 A1 | 2/2003 | Schmalz et al. | |
| 2003/0164620 A1 | 9/2003 | Schmalz et al. | |
| 2005/0258657 A1 | 11/2005 | Gebauer et al. | |
| 2012/0319416 A1 | 12/2012 | Ellis et al. | |
| 2013/0129464 A1 | 5/2013 | Regan et al. | |
| 2015/0081090 A1 | 3/2015 | Dong | |
| 2015/0328779 A1 | 11/2015 | Bowman et al. | |
| 2015/0375401 A1 | 12/2015 | Dunkmann et al. | |
| 2016/0075537 A1 | 3/2016 | Lundin | |
| 2016/0271805 A1 | 9/2016 | Kuolt et al. | |
| 2017/0050315 A1 | 2/2017 | Henry et al. | |
| 2017/0080579 A1 | 3/2017 | Wagner et al. | |
| 2017/0087718 A1 | 3/2017 | Wagner et al. | |
| 2017/0120455 A1 | 5/2017 | Wagner et al. | |
| 2018/0134501 A1 | 5/2018 | Ge et al. | |
| 2019/0134827 A1 | 5/2019 | Wagner et al. | |
| 2020/0398442 A1 | 12/2020 | Wagner et al. | |
| 2022/0241963 A1 | 8/2022 | Mizoguchi et al. | |
| 2022/0314460 A1 | 10/2022 | Sun et al. | |

FOREIGN PATENT DOCUMENTS

| | | |
|---|---|---|
| CN | 101023523 A | 8/2007 |
| CN | 105197598 A | 12/2015 |
| CN | 111315546 A | 6/2020 |
| CN | 116408824 A | 7/2023 |
| DE | 3810989 A1 | 8/1989 |
| DE | 10121344 A1 | 11/2002 |
| DE | 102011115951 A1 | 4/2013 |
| DE | 102015202603 A1 | 8/2016 |
| EP | 1256421 A1 | 11/2002 |
| EP | 1671906 A1 | 6/2006 |
| EP | 2014587 A2 | 1/2009 |
| EP | 2960024 A2 | 12/2015 |
| JP | 2010201536 A | 9/2010 |
| WO | 2014161549 A1 | 10/2014 |
| WO | 2017035466 A1 | 3/2017 |
| WO | 2017044632 A1 | 3/2017 |
| WO | 2019094382 A2 | 5/2019 |

OTHER PUBLICATIONS

Communication pursuant to Rules 161(1) and 162 EPC issued by the European Patent Office in related European Patent Application No. 18815396.9 on Jun. 17, 2020, 3 pages.

Examiner's Report issued by the Innovation, Science and Economic Development Canada (Canadian Intellectual Property Office) in related Canadian Patent Application No. 3,080,961 on Jul. 14, 2021, 4 pages.

Final Office Action issued by the U.S. Patent and Trademark Office on Jan. 29, 2020 in related U.S. Appl. No. 16/182,007, 8 pages.

International Preliminary Report on Patentability issued by the International Bureau of WIPO in related International Application No. PCT/US2018/059445 on May 22, 2020, 9 pages.

International Search Report and Written Opinion of the International Searching Authority issued on May 13, 2019 in related International Application No. PCT/US2018/059445, 12 pages.

Non-Final Office Action issued by the U.S. Patent and Trademark Office on Oct. 7, 2019 in related U.S. Appl. No. 16/182,007, 7 pages.

Non-Final Office Action issued by the U.S. Patent and Trademark Office in related U.S. Appl. No. 17/011,393 on Jan. 12, 2022, 7 pages.

Notice on the First Office Action, and its English translation, issued by the China National Intellectual Property Administration, in related Chinese Patent Application No. 201880071659.2 on Aug. 19, 2022, 25 pages.

Communication pursuant to Article 94(3) EPC issued by the European Patent Office in related European Patent Application No. 18815396.9 on Jun. 19, 2024, 6 pages.

Examiner's Report issued by the Innovation, Science and Economic Development Canada (Canadian Intellectual Property Office) in related Canadian Patent Application No. 3,080,961 on Sep. 20, 2022, 3 pages.

* cited by examiner ic # SYSTEMS AND METHODS FOR PROVIDING DYNAMIC VACUUM PRESSURE AT AN END EFFECTOR USING A SINGLE VACUUM SOURCE

PRIORITY

The present application is a continuation of U.S. patent application Ser. No. 17/011,393, filed Sep. 3, 2020, now U.S. Pat. No. 11,426,881, issued Aug. 30, 2022 which is a continuation of U.S. patent application Ser. No. 16/182,007, filed Nov. 6, 2018, now U.S. Pat. No. 10,814,498, issued Oct. 27, 2020, which claims priority to U.S. Provisional Patent Application Ser. No. 62/582,651, filed Nov. 7, 2017, the disclosures of which are hereby incorporated by reference in their entireties.

BACKGROUND

The invention generally relates to the use of programmable motion systems to pick up an object and move it to a desired location, particularly when a single device must pick up a variety of objects, possibly differing in weight, size, shape, and surface texture, or when a single device must operate in a variety of conditions, possibly picking off of a belt, out of a bin, out of a group of similar objects, or out of a group of dissimilar objects.

Many vacuum grippers in programmable motion devices employ vacuum pressures well below 50% of atmospheric pressure, and are referred to herein as high vacuum. A typical source for a high vacuum gripper is a Venturi ejector, which produces high vacuum but low maximum air flow. Because of the low flow, it is essential to get a good seal between a vacuum gripper and an object, and it is also important to minimize the volume to be evacuated. Suppliers of such ejectors and related system components include Vaccon Company, Inc. of Medway, MA, Festo US Corporation of Hauppauge, NY, Schmalz, Inc. of Raleigh, NC and others.

In some instances, for example, where a good seal is not possible, other systems use high flow devices. Typical high flow devices are air amplifiers and blowers, which produce the desired flows, but cannot produce the high vacuum of a high vacuum source. High flow sources include the side-channel blowers supplied by Elmo Rietschle of Gardner, MA, by Denver, Inc. of Quincy, IL, by Fuji Electric Corporation of America of Edison, NJ, and by Schmalz, Inc. of Raleigh, NC. It is also possible to use air amplifiers as supplied by EDCO USA of Fenton, MO and by EXAIR Corporation of Cincinnati, OH. Multistage ejectors are also known to be used to evacuate a large volume more quickly, wherein each stage provides higher levels of flow but lower levels of vacuum.

There are therefore, two different principles for vacuum grippers, generally referred to as high vacuum and high flow. In a high vacuum system, the vacuum gripper is assumed to be in contact with the object surface. The operating principle is that the lifting force is obtained by multiplying the static pressure differential by the area of the vacuum cup. In practice, the most common approach is to arrange for a tight seal between an object and a gripper, to select a vacuum source such as a Venturi which provides a large static pressure differential, and then to select a cup sized large enough to produce the desired lifting force.

Despite the name, for some high vacuum cases, the pressure differential at each actual opening may not be particularly high (see, for example, U.S. Patent Application Publication No. 2013/0129464). It is only necessary that the pressure differential multiplied by the total gripper sealed area exceed the desired lifting force. Whether the vacuum is high or not, the principle is the same: lifting force is obtained through a static pressure differential.

A principal problem with the high vacuum approach is that if the gripper can only obtain a poor seal, air leakage becomes significant, which can degrade the pressure differential, resulting in loss of lifting force. When a poor seal is anticipated, a better-suited vacuum source may be selected, such as a multi-stage Venturi, an air amplifier, or a Coanda effect blower, in order to maintain a sufficient static pressure differential despite the air flow. Regardless, the operating principle is the same, which is static pressure.

With the high flow approach on the other hand, the lifting force is provided not by static pressure differential, but by aerodynamic drag, arising from a high velocity flow of air past the object. In practice, the gripper is typically attached to a vacuum source that is engineered to provide a high flow of air, such as a centrifugal blower, a side-channel blower, or a high flow Coanda effect blower, rather than a Venturi source. This high rate of flow can lift objects before they are even in contact with the gripper, and can hold objects with poor seals, in some instances even objects much smaller in size than the gripper (as long as the object is not lost into the gripper).

The systems that use high flow are different, and any programmable motion system that uses both must change the source from one of high vacuum to one that provides high flow. Further, standard vacuum cups and connectors must be modified to increase the aperture size. Vacuum hoses must also have higher than standard apertures, and be selected for a combination of flexibility and smoothness to avoid back pressure at high flow rates. Additionally, traditional vacuum equipment suppliers do not sell valves that are suitable for such high flow applications.

Selecting the vacuum source and gripper geometry for a high flow application is more challenging than for a high vacuum application, owing to the greater difficulty in modeling aerodynamic flow compared with static pressure differential. Variations in applications, combined with the complexity of fluid dynamics (e.g., involving, in part, passage sizes, conduit bend shapes and angles, and passage interior surface textures), means that different models will be required for different circumstances. Any resulting high flow model departs from the static pressure model, yielding maximum lift force as a quadratic function of unrestricted area of the gripper, which is fundamentally different than that of a high vacuum model.

Despite the variety of vacuum systems, therefore, there remains a need for an end effector in a robotic system that is able to efficiently and economically accommodate a wide variety of applications involving engaging a variety of types of objects. There is further a need for a system that includes an end effector that is able to provide high flow and/or high vacuum using a gripper that is able to handle a wide variety of objects, and further for a simple and cost-effective hybrid gripper that is able to provide either high vacuum or high flow as appropriate to the task at hand.

SUMMARY

In accordance with an embodiment, the invention provides a system including a programmable motion device and an end effector for grasping objects to be moved by the programmable motion device. The system includes a vacuum source that provides a high flow vacuum such that an object may be grasped at an end effector opening while permitting a substantial flow of air through the opening, and a dead-head limitation system for limiting any effects of dead-heading on the vacuum source in the event that a flow of air to the vacuum source is interrupted.

In accordance with another embodiment, the invention provides a method of moving an object using a programmable motion device and a vacuum end effector for grasping at an end effector opening, objects to be moved by the programmable motion device. The method includes the steps of grasping a non-sealing object at the end effector opening while permitting substantial flow of air through the opening, grasping a sealing object at the end effector opening, wherein the sealing object and the end effector opening provide a seal at the end effector opening, and limiting any effects of dead-heading on the vacuum source.

In accordance with a further embodiment, the invention provides a method of moving an object using a programmable motion device and a vacuum end effector for grasping at an end effector opening, objects to be moved by the programmable motion device. The method includes the steps of grasping a non-sealing object at the end effector opening while permitting substantial flow of air through the opening, grasping a sealing object at the end effector opening, wherein the sealing object and the end effector opening provide a seal at the end effector opening, and cooling the vacuum source.

BRIEF DESCRIPTION OF THE DRAWINGS

The following description may be further understood with reference to the accompanying drawings in which.

The drawings are shown for illustrative purposes only.

DETAILED DESCRIPTION

Figure 1:
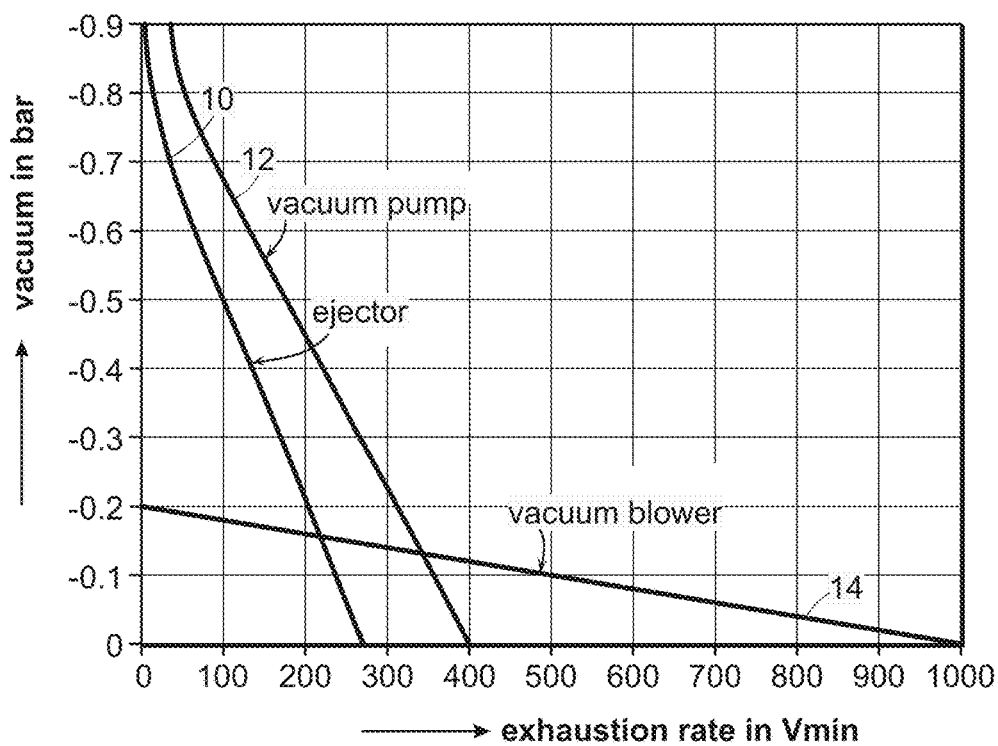
FIG. 1 shows an illustrative graphical representation of the performance of different vacuum sources.

The invention provides a hybrid gripper, e.g., one that employs either high vacuum or high flow depending on circumstances. One approach is to provide two different vacuum sources for the device, a high vacuum source such as a Venturi source and a high flow source such as a blower. FIG. 1 shows a graph of vacuum exhaustion rate (in liters/min) vs. vacuum pressure (in bar), and in particular, shows at 10 the rate/pressure relationship for an ejector source, shows at 12 the rate/pressure relationship for a vacuum pump (both high vacuum), and shows at 14 the rate/pressure relationship for a vacuum blower (high flow). Switching of sources may be accomplished by a control signal based on the object being picked up, or sense data acquired during operations. Alternatively, switching of sources may be accomplished by check valves. The expense and complexity of a second vacuum source however, are not always justifiable.

The single source hybrid gripper of certain embodiments of the invention employs just one vacuum source, with additional hardware and operating procedures so that either high flow or high vacuum gripping may be obtained, depending on the item, the surroundings, and the nature of the seal.

Figure 2:
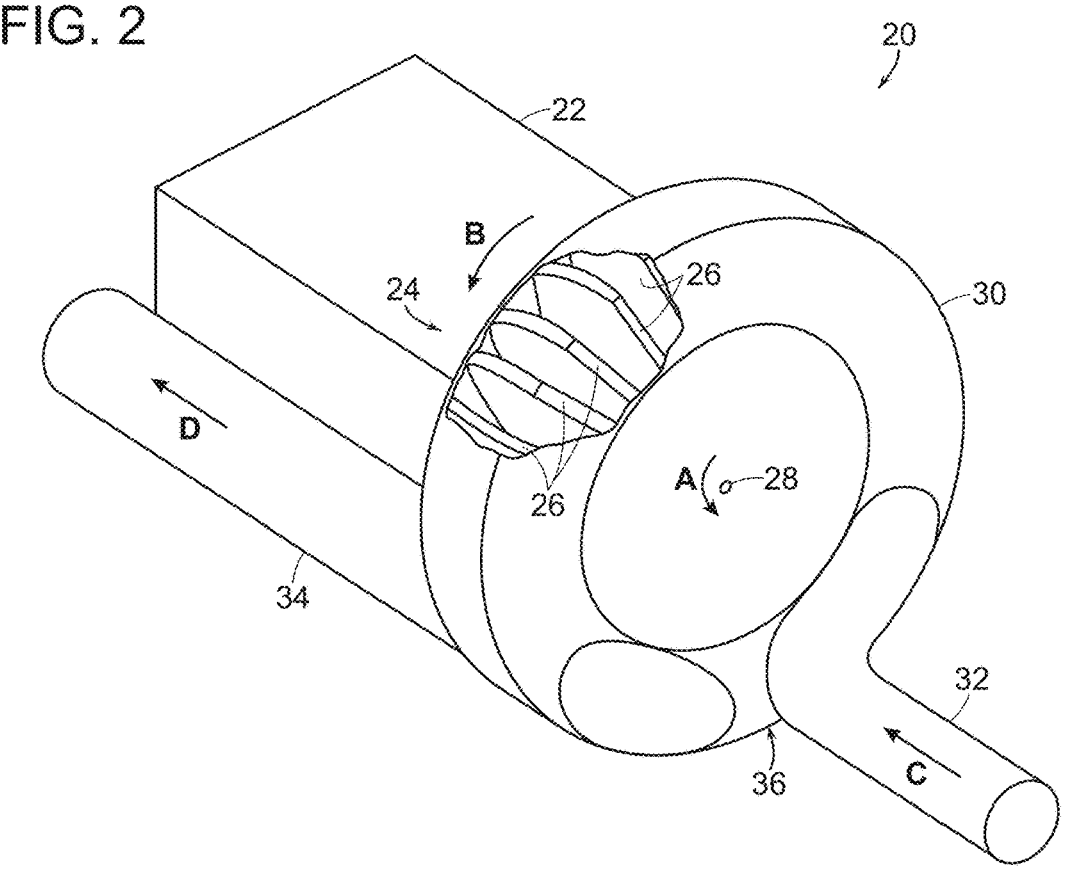
FIG. 2 shows an illustrative diagrammatic view of side channel blower for use in accordance with an embodiment of the present invention.

In accordance with an embodiment, the system may employ a side-channel blower 20 as shown diagrammatically in FIG. 2. The side-channel blower 20 includes a motor 22 that drives an output shaft 28 on which is mounted a blower assembly 24. The blower assembly 24 includes a set of angularly disposed fan blades 26 (which may or may not be curved or angled or specially shaped), and are provided within an annular housing 30. The blower assembly 24 rotates in a direction about the shaft 28 as indicated at A, which causes the fan blades 26 to rotate in a direction as indicated at B. As the fan blades rotate, they entrain fluid (e.g., air), which causes air to enter the vacuum tube 32 in a direction as shown at C, and to exit the blower 20 at an outlet tube 34 as indicated at D.

Generally, the annular space around the fan blades 26 is spacious for most of the cycle, but in the area between the inlet and outlet (as indicated at 36), there is very little space between the fan blades and the inside of the annular surface. This causes the blower assembly to draw air in as shown at C, and to produce a volume of air as shown at D. The blower assembly 24 provides high flow, with the advantage that the static pressure is higher than other high flow sources, even attaining vacuum levels above 50%. With no further modification, the gripper would exhibit high flow gripping for porous objects, objects smaller than the vacuum cup, and any other object failing to provide a good seal, and would also exhibit high vacuum gripping when a good seal happens to occur, except that a significant problem exists that is solved by certain embodiments of the present invention as discussed in more detail below.

Figure 3A:
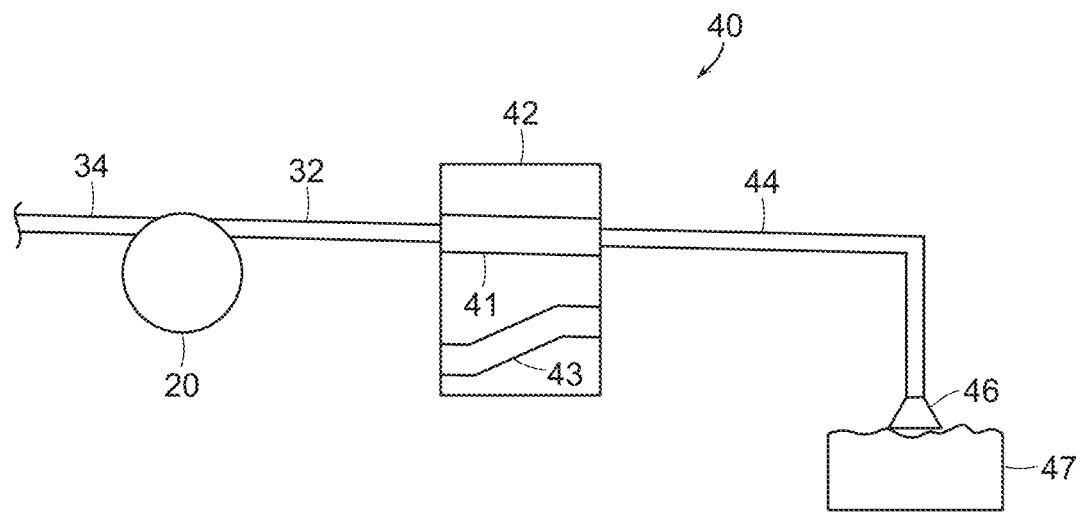
FIGS. 3A and 3B show illustrative diagrammatic views of a system in accordance with an embodiment of the present invention using a linear valve.
Figure 3B:
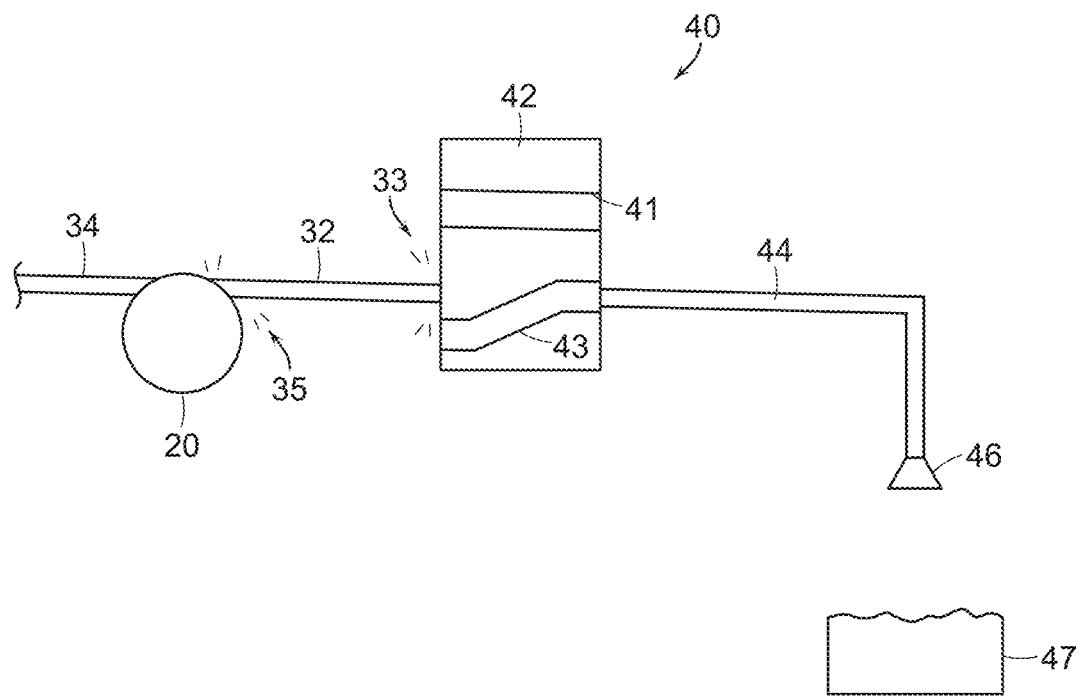

FIGS. 3A and 3B show an embodiment of the invention that includes a single source 20 having an inlet 32 and an outlet 34 that selectively communicate with a gripper 46 via a vacuum line 44 through a valve 42 to grasp an object 47.

The valve connects the gripper 46 either to the blower 20 (via channel 41 to grip the object 47 as shown in FIG. 3A) or to atmosphere (via channel 43 to release the object 47 as shown in FIG. 3B). The valve moves linearly to switch the connections. The problem is that side-channel blowers are typically not designed to be dead-headed. That is, they are not designed for sustained operation with the air flow completely blocked as shown at 33 in FIG. 3B, which causes the blower 20 to be dead-headed as shown at 35. The air flow serves to cool the blower. When air flow is blocked, the blower is susceptible to damage and failure from overheating. If the time that the air flow is blocked is minimized, and/or if other steps are taken to ensure sufficient cooling of the blower, e.g., by providing a different air flow path to the blower, or by increasing a time between periods when the air flow is blocked, or by active cooling of the blower, such a system may function properly in certain embodiments of the present invention.

Figure 4A:
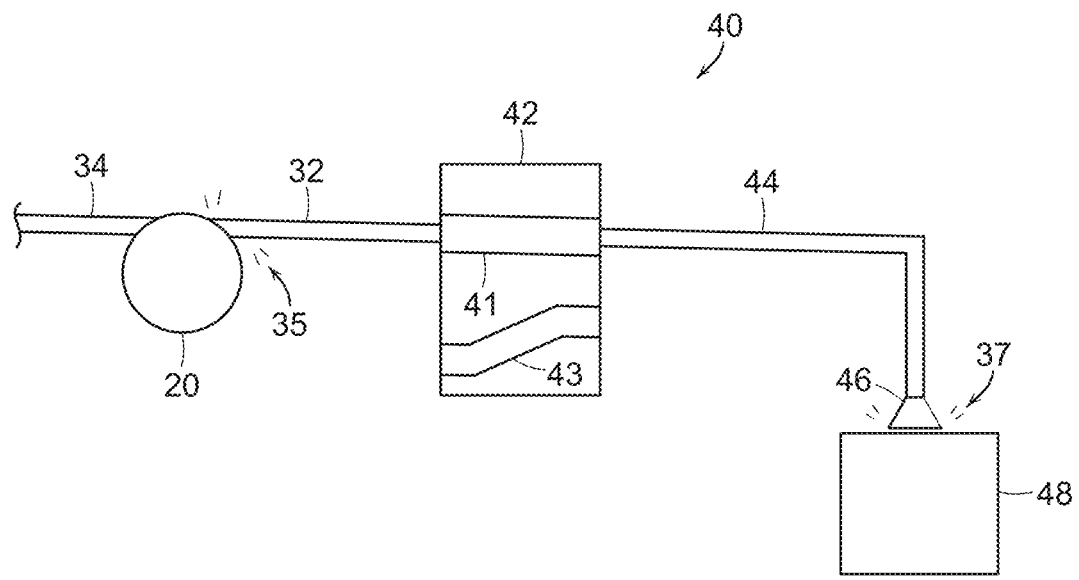
FIGS. 4A and 4B show illustrative diagrammatic views of a system in accordance with an embodiment of the present invention using a linear valve with two channels.
Figure 4B:
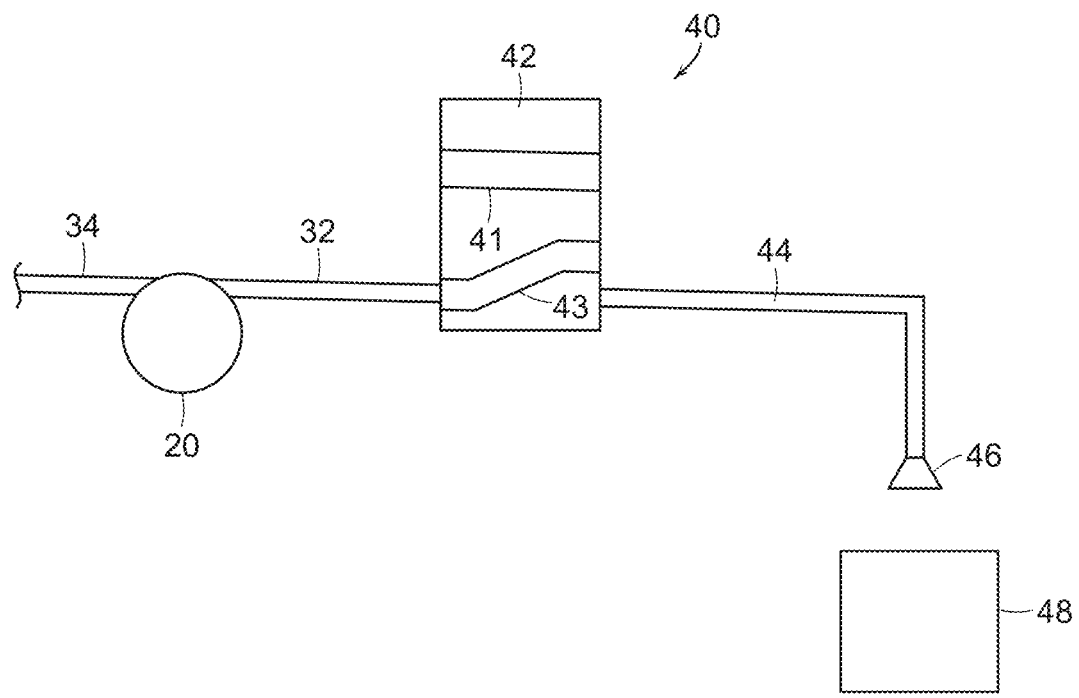

More fundamentally however, the system may encounter a more prolonged dead-headed state in simply lifting an object. FIGS. 4A and 4B show a system 40 in accordance with an embodiment of the present invention that includes the single source 20 having the inlet 32 and the outlet 34 selectively communicating with the gripper 46 via the vacuum line 44 through the valve 42 to grasp the object 48. The valve 42 connects the gripper 46 either to the blower 20 (via channel 41 to grip the object 48 as shown in FIG. 4A) or to atmosphere (via channel 43 to release the object 48 as shown in FIG. 4B). The valve moves linearly to switch the connections.

Figure 5:
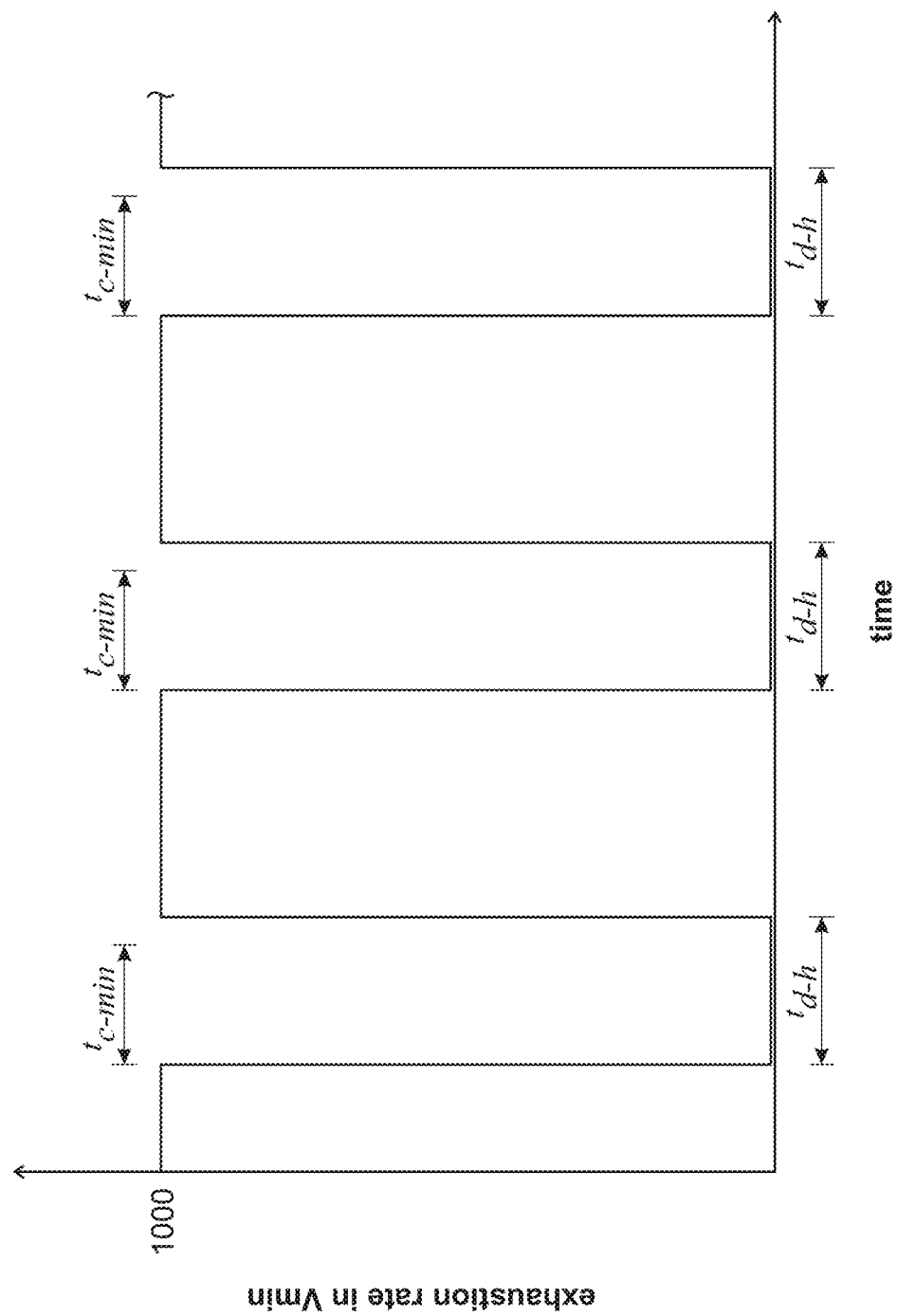
FIG. 5 shows an illustrative graphical representation of exhaustion rate verses time in a system in accordance with an embodiment of the present invention.

Although the valve may be used to mitigate dead-heading of the blower upon release (FIG. 4B), a problem in this embodiment is that when the gripper 46 engages the object (as shown in FIG. 4A), a seal is formed between the gripper 46 and the object surface 48 (as shown at 37), causing the blower to become dead-headed (as shown at 35). While dropping an object may require only a relatively small amount of time, moving and then dropping an object may require too much time for a blower system to withstand such a prolonged period of dead-heading, particularly if successive objects form a good seal with the end effector. In accordance with an embodiment, the invention provides that between times of dead-heading ($t_{d-h}$), the system will provide airflow for a sufficient amount of time ($t_{c-min}$) to cool the blower as shown in FIG. 5. If a seal is not formed between the end effector and the object, then sufficient air flow may be provided during grasping to prevent the blower from overheating.

Figure 6A:
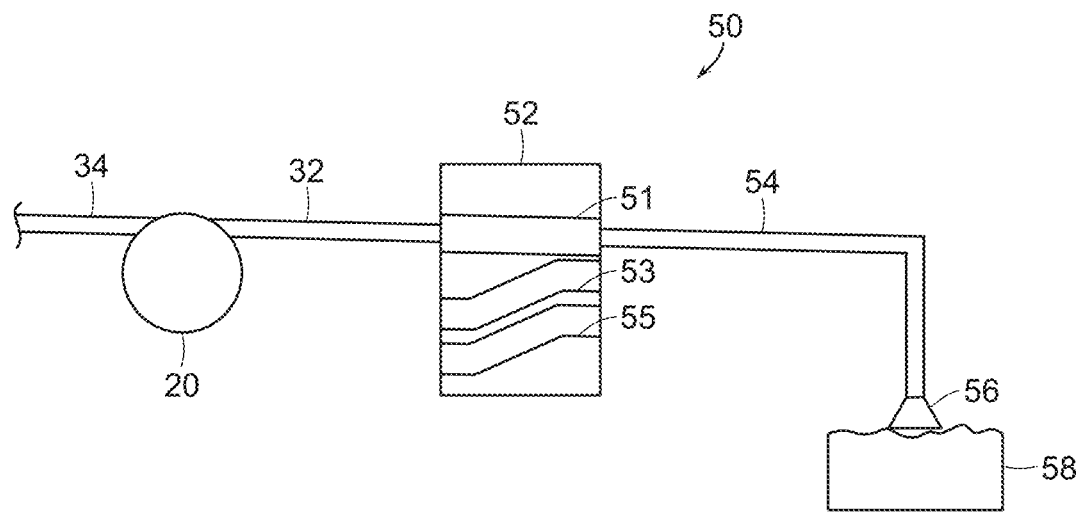
FIGS. 6A and 6B show illustrative diagrammatic views of a system in accordance with an embodiment of the present invention using a linear valve with three channels.
Figure 6B:
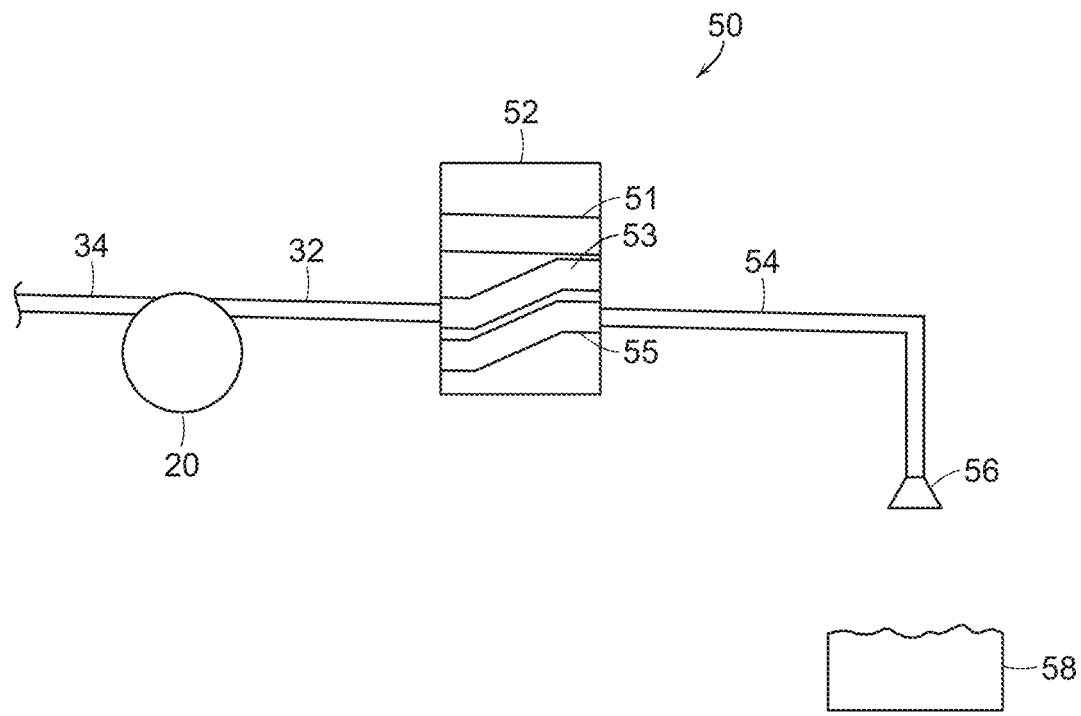

FIGS. 6A and 6B show a system 50 of another embodiment that includes a single source 20 having an inlet 32 and an outlet 34 that selectively communicate with a gripper 56 via a vacuum line 54 and a valve 52. The valve 52 connects the gripper 56 either to the blower 20 (via channel 51 to grip the object 58 as shown in FIG. 6A) or to atmosphere (via channel 55 to release the object 58 as shown in FIG. 6B). Again, the valve moves linearly to switch the connections. When in the release position, as shown in FIG. 6B, a further channel 53 is provided that connects the blower to atmosphere as well, preventing the blower 20 from becoming dead-headed.

Figure 7A:
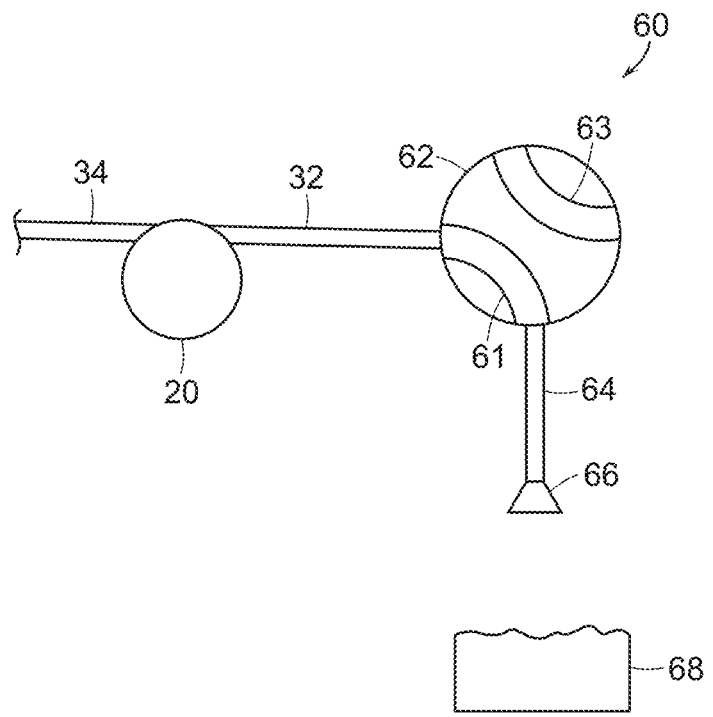
FIGS. 7A-7D show illustrative diagrammatic views of a system in accordance with an embodiment of the present invention using a rotary valve.
Figure 7B:
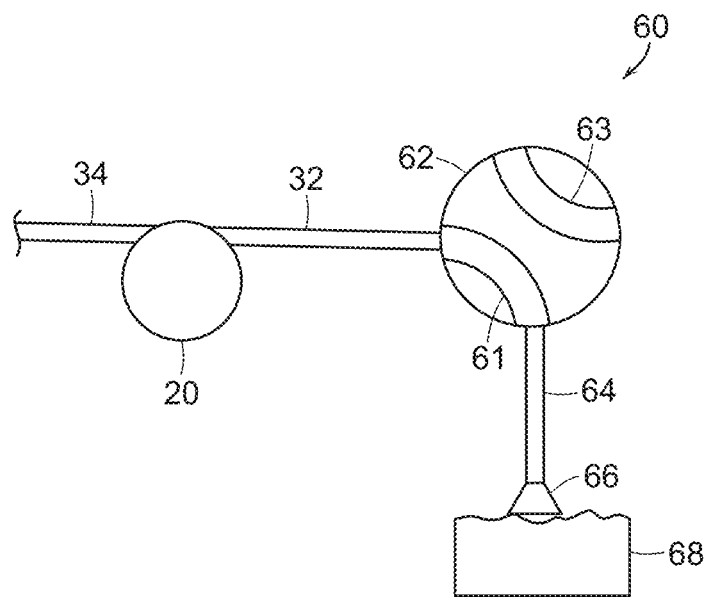
Figure 7C:
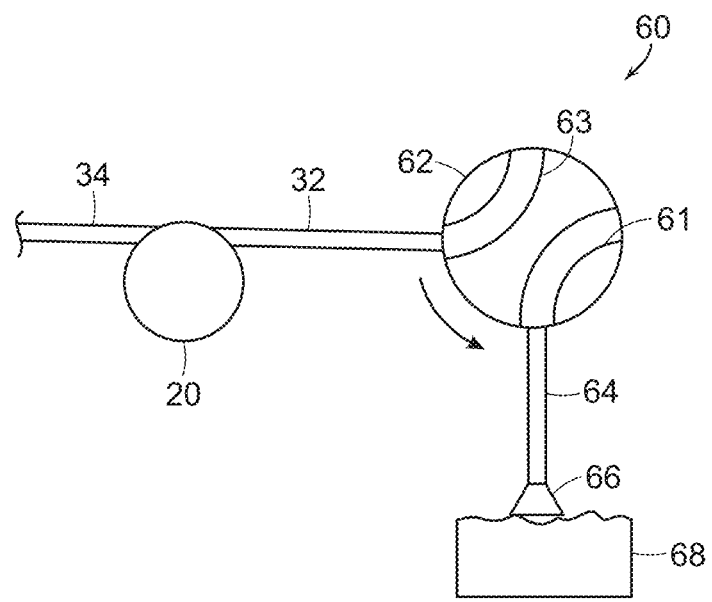
Figure 7D:
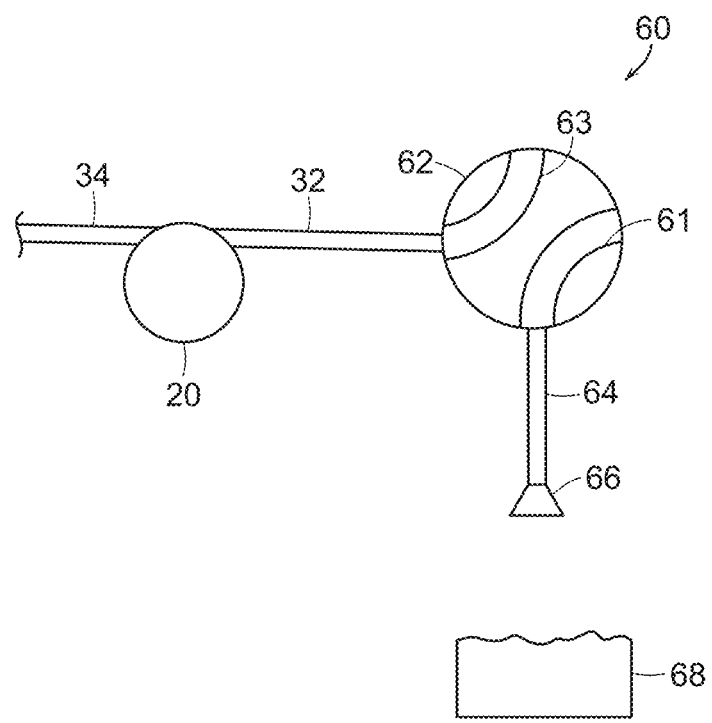

FIGS. 7A-7D show a system 60 of another embodiment that includes a single source 20 having an inlet 32 and an outlet 34 that selectively communicate with a gripper 66 via a vacuum line 64 and a valve 62. The valve 62 connects the gripper 66 either to the blower 20 (via channel 61 to grip the object 68 as shown in FIGS. 7A and 7B) or the valve connects each of the blower 20 and the gripper 66 to atmosphere (via channels 61, 63 as shown in FIGS. 7C and 7D) to release the object 68. As shown in FIGS. 7B and 7C, the valve rotates to provide the desired connection state. When in the release position, as shown in FIGS. 7C and 7D, a further channel 63 is provided that connects the blower to atmosphere as well, preventing the blower 20 from becoming dead-headed.

Figure 8A:
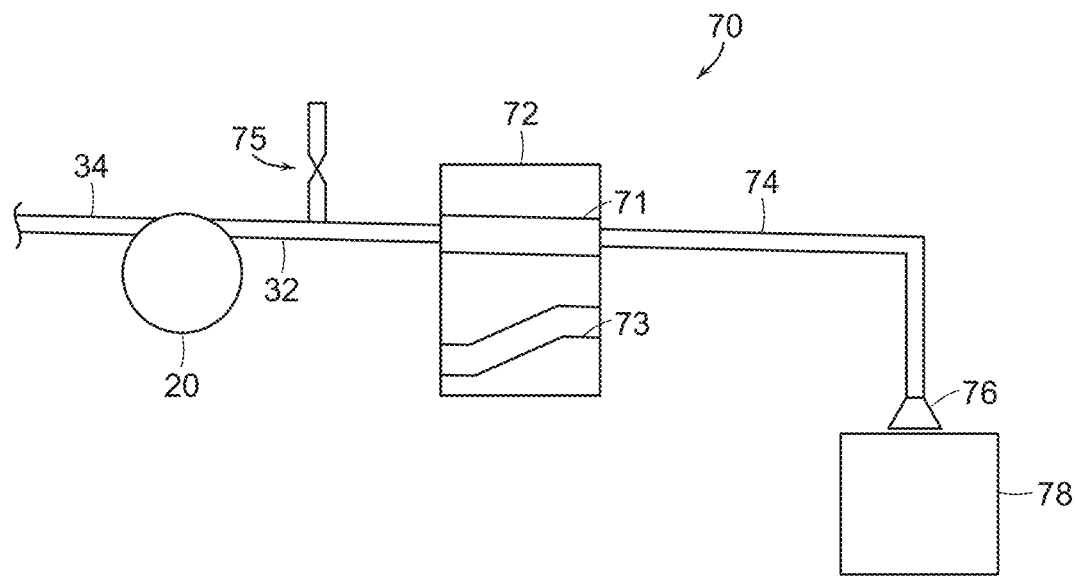
FIGS. 8A and 8B show illustrative diagrammatic views of a system in accordance with an embodiment of the present invention using a linear valve and a relief valve.
Figure 8B:
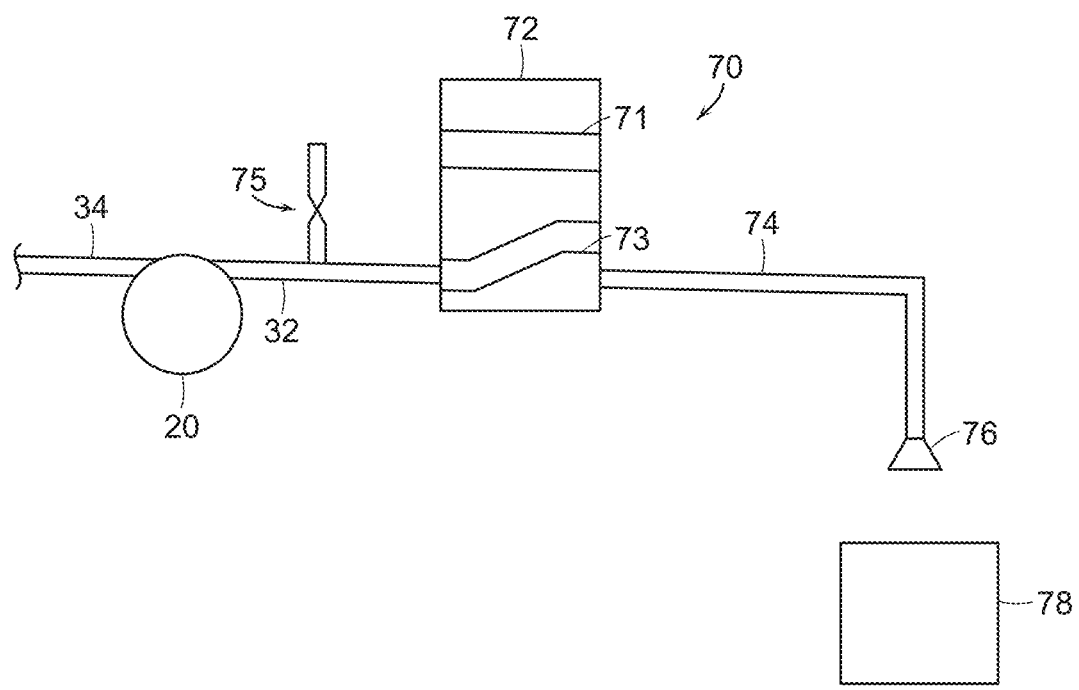

While such embodiments may function well with objects that do not seal the gripper and applications in which any dead-heading is very brief, certain applications may require that objects be grasped and maintained for longer periods of time that result in the blower dead-heading. FIGS. 8A and 8B show a system 70 in which a linear actuated valve 72 is provided together with a relief valve 75. In particular, the system 70 includes a single source 20 having an inlet 32 and an outlet 34 that selectively communicate with a gripper 76 via a vacuum line 74 and the valve 72. The valve 72 connects the gripper 76 either to the blower 20 (via channel 71 to grip the object 78 as shown in FIG. 8A) or to atmosphere (via channel 73 to release the object 78 as shown in FIG. 8B). The relief valve 75 provides that some air is always being provided to the blower 20, preventing dead-heading if a seal is formed at the gripper.

Figure 9A:
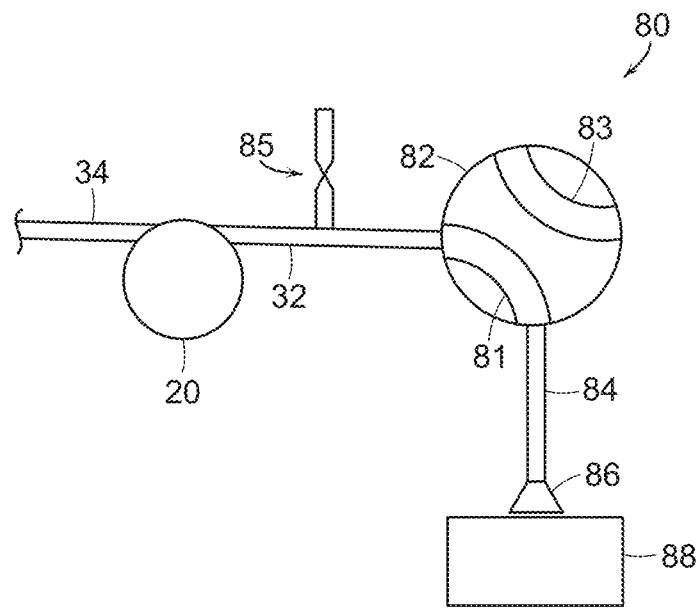
FIGS. 9A and 9B show illustrative diagrammatic views of a system in accordance with an embodiment of the present invention using a rotary valve and a relief valve.
Figure 9B:
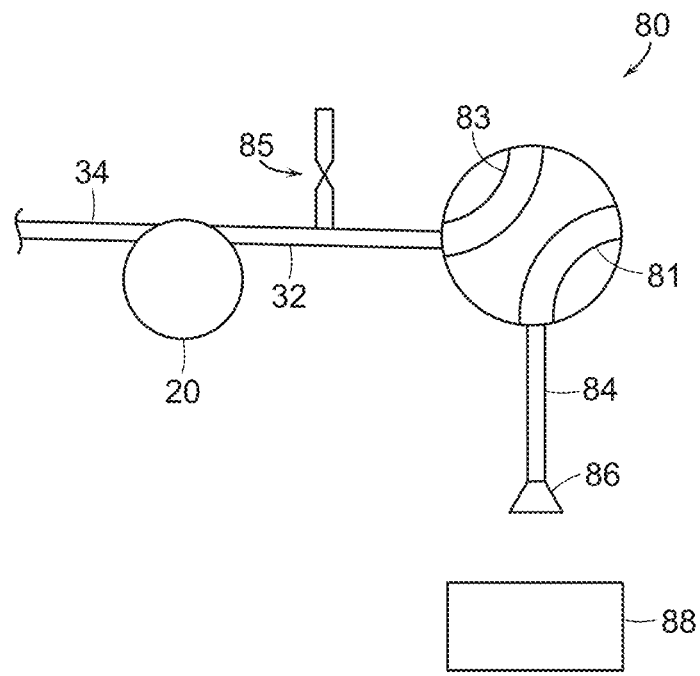

FIGS. 9A and 9B show a system 80 in which a rotatably actuated valve 82 is provided together with a relief valve 85. In particular, the system 80 includes a single source 20 having an inlet 32 and an outlet 34 that selectively communicate with a gripper 86 via a vacuum line 84 and the valve 82. The valve 82 connects the gripper 86 either to the blower 20 (via channel 81 to grip the object 88 as shown in FIG. 9A) or to atmosphere (via channel 81 when rotated to release the object 78, while also connecting the blower 20 to atmosphere via channel 83 as shown in FIG. 9B). The relief valve 85 provides that some air is always being provided to the blower 20, preventing dead-heading if a seal is formed at the gripper.

The relief valves 75, 85 may be employed to allow regulated flow of air. The flow might be a constant small flow, enough to eliminate the dead-heading condition and allow blower cooling, but not enough to defeat the gripper function. In accordance with further embodiments, the relief valve may provide a variable flow modulated by the state of operation, or the (estimated or sensed) temperature of the blower, or other operating conditions. The relief valve might inject a gas or liquid with preferred thermal properties, such as an oil or water-based coolant.

The invention therefore provides many options to mitigate dead-heading, such as for example, providing a different valve logic, so that when the item is released by connecting the gripper to atmosphere, it also connects the blower to atmosphere, allowing flow of air to cool the blower; modulating the duty cycle of the device. Dead-heading occurs when either (a) a good seal is obtained, or (b) a valve is closed. It is possible to limit the blower heating by limiting the time in state (a) or (b).

Figure 10:
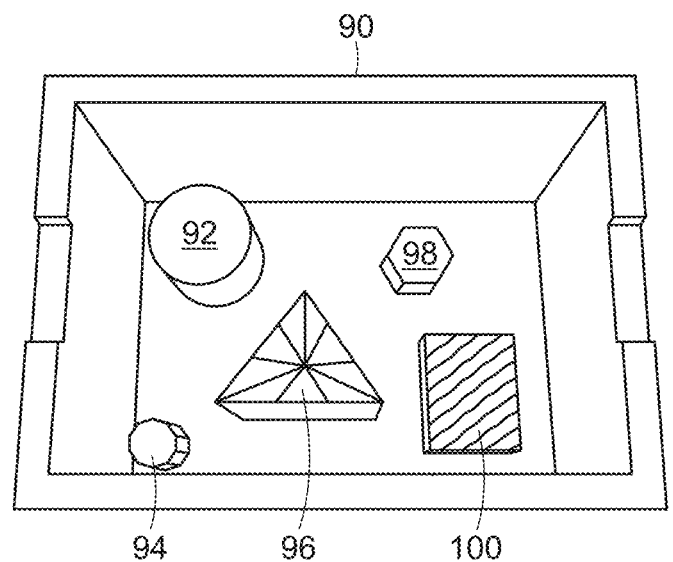
FIG. 10 shows an illustrative diagrammatic view of a plurality of different objects to be processed in a bin.
Figure 11:
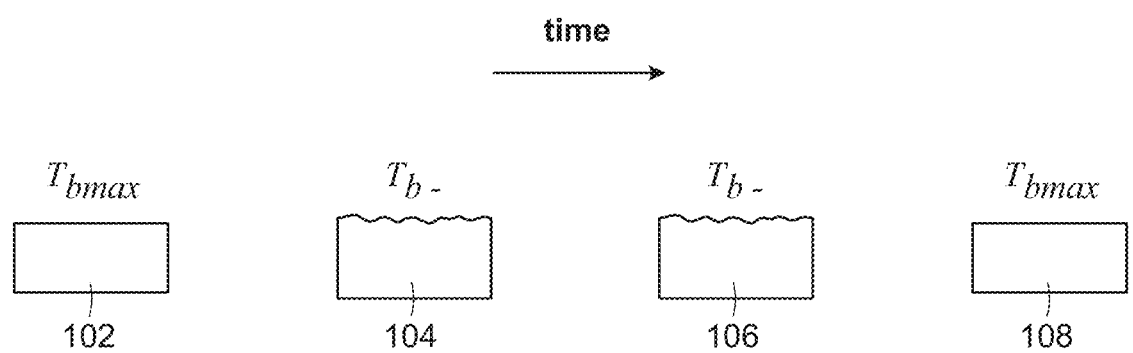
FIG. 11 shows an illustrative diagrammatic view of objects being successively processed in a system in accordance with an embodiment of the present invention.

FIG. 10 shows a bin 90 of heterogeneous objects 92, 94, 96, 98, 100. Each object in the bin 90 may have a different surface texture, and may form a different level of seal with a vacuum end effector. In accordance with certain embodiments of the present invention, the system uses this information to regulate dead-heading of the blower. In particular, and with reference to FIG. 11, the system may elect to grasp an object 102 that is known to provide a tight seal with the vacuum end effector, causing the blower to reach a high temperature ($T_{b-max}$). As this will cause dead-heading of the blower, the system may then elect to grasp one or two or more further objects that are known to not form a tight seal with the vacuum end effector, which will therefore reduce the temperature of the blower ($T_{b-}$). For example, the system may then elect to move objects 104 and 106 prior to again choosing to move an object 108 that may be known to provide a tight seal with a vacuum end effector.

Figure 12:
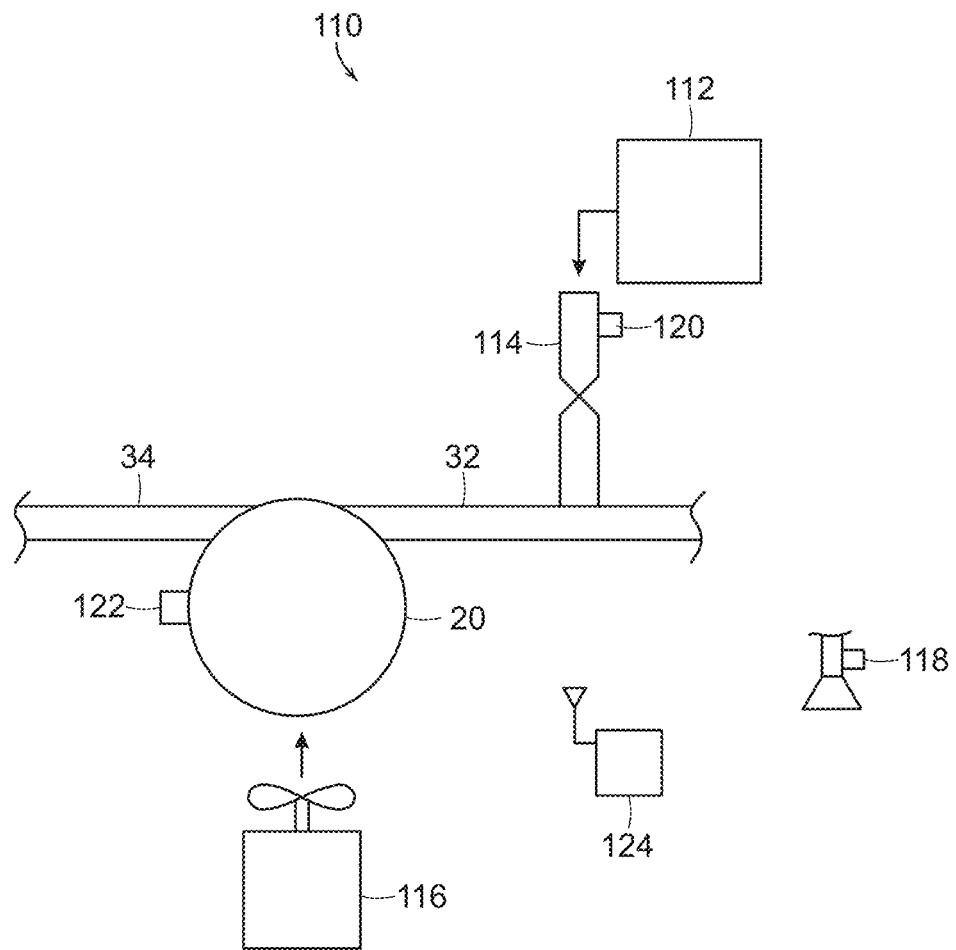
FIG. 12 shows an illustrative diagrammatic view of blower cooling systems in accordance with an embodiment of the present invention.

In accordance with further embodiments therefore, the relief valve may inject a gas or liquid with preferred thermal properties, such as an oil or water-based coolant. FIG. 12, for example, shows a system 110 that includes a coolant source 112 that is coupled to a relief valve 114 for providing an oil or water-based coolant to the blower 20. Cooling may also be provided by a fan or additional blower 116 that is independent of, and directed at, the vacuum source blower 20. Cooling may further be provided by liquid cooling ports in the blower housing, or by a liquid cooled jacket. Additionally, sensors (e.g., 118, 120, 122), may be placed on any of the gripper, the blower or other components to sense pressure, flow and/or temperature, and the additional cooling systems (e.g., 112, 114) may be operable by one or more computer processors 124 responsive to any sensor data. Visual sensing may also be employed to guide placement of the gripper on or near an object, or set of objects, or away from clutter to be avoided, and pressure and flow sensing may be used to determine the gripper state and proximity of items to the gripper.

The system may be controlled to most effectively pick and place objects, with additional measures related to blower cooling. Using knowledge of blower thermal properties, along with knowledge of recent history of pressure, flow, and blower control signals, and valve control signals, the system could maintain an estimate of blower temperature, and use that estimate to employ mitigation strategies described above.

In accordance with various embodiments, therefore, the invention provides a gripper that shifts between high vacuum (static pressure) and high flow (aerodynamic drag) as conditions require using a single source of vacuum. The vacuum source may be a side-channel blower, and the vacuum source may be connected to the gripper by a gripper control valve that is open to grip objects and closed to release objects. The gripper control valve may be ganged or synchronized with a blower vent valve that connects the blower to atmosphere when it is not connected to the gripper. The gripper control valve may be left open at times other than when gripping, allowing a flow of air to cool the blower. The time spent gripping objects, or in other phases that prevent ventilation of the motor, may be modulated to prevent overheating of the blower.

A relief valve may be positioned to allow entry of a cooling fluid, which may be atmospheric air, or a different gas, or a liquid, to enter the system and cool the blower. The relief valve may be continuously open to allow a small flow, sufficient to cool the blower, but insufficient to defeat the gripping function. The relief valve may operate according to sensed pressure, flow, temperature or time signals.

The system may also have one or more sensors, which may be flow sensors, pressure sensors, force sensors, or temperature sensors. The gripper may be the end effector of a programmable motion device such as a robot arm, and the motion of the arm may be modulated to maintain flow of air sufficient to cool the blower. The motion of the arm may include picking a sufficient number of objects that will not seal with the gripper, thereby maintaining a flow of air sufficient to cool the blower. The control processor 124 may use sensor information and an engineering model of the blower thermal behavior to choose gripper behavior and command valve opening and closing.

Figure 13:
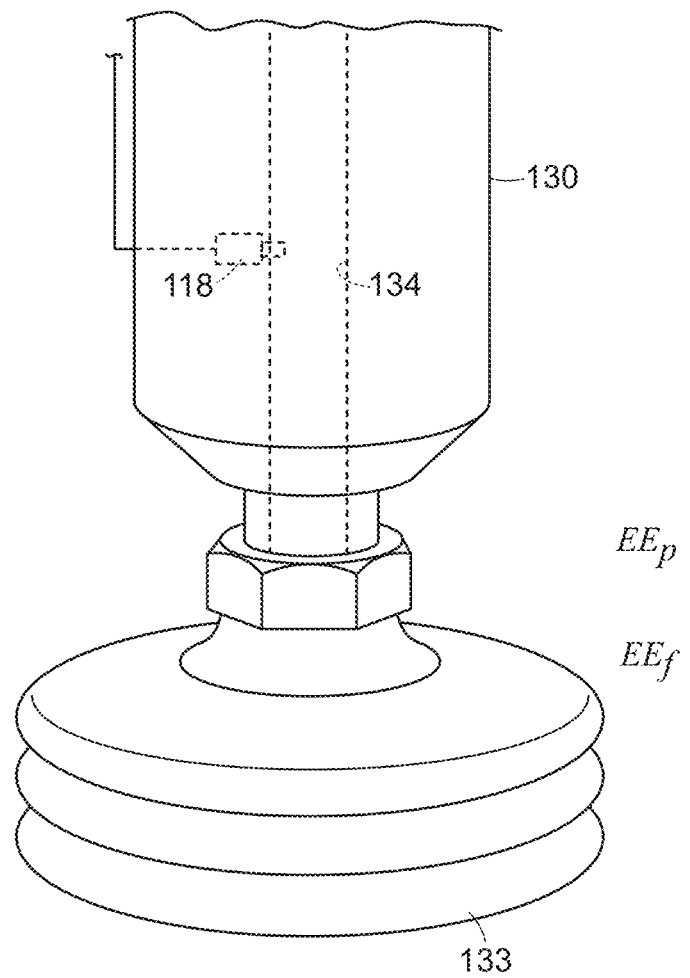
FIG. 13 shows an illustrative diagrammatic view of an end effector for use in accordance with a system of the invention that includes an internal sensor.

With reference to FIG. 13, the system may use an end effector 130 with a vacuum bellows 133, and a sensor 118 that includes any of a flow sensor or a pressure sensor for sensing any of pressure or flow within the vacuum line 134 of the end effector 130 ($EE_p$, $EE_F$). The system, for example using one or more computer processing systems 124, may compute from observations of flow and pressure during use, expected flow and pressure values, as well as thresholds associated with blower dead-heading.

Figure 14:
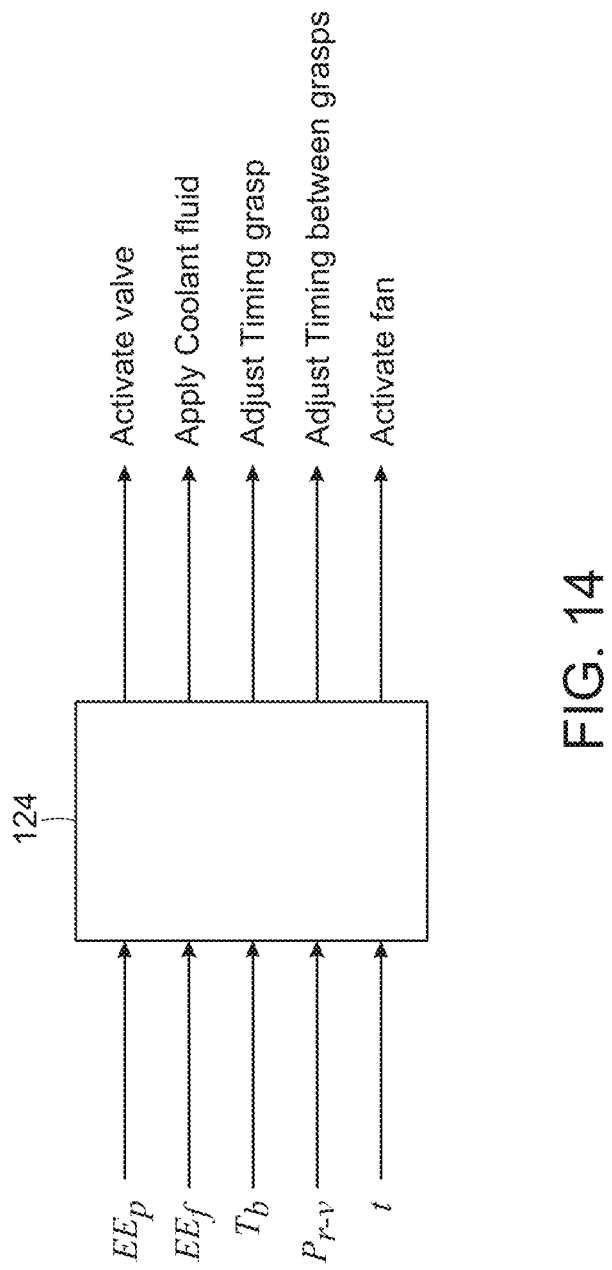
FIG. 14 shows an illustrative diagrammatic view of a control system for use in a system in accordance with an embodiment of the present invention.

FIG. 14 shows various alternatives for providing a limiting of the effects of dead-heading. In particular, inputs to the system may include any of an end effector pressure ($EE_p$), an end effector flow ($EE_f$), a blower temperature ($T_b$), a pressure at the relief value ($P_{rv}$), or a timer that monitors how long the blower has been in dead-head state ($t_{d-h}$). Responsive to any of these inputs, the system, again using one or more computer processing systems 124, may actuate a linear or rotary valve, may permit a relief valve to provide any of air or a cooling fluid to the blower, may limit a period of time of grasping an object with a good seal, may adjust (lengthen) the timing between grasps, or may engage a fan to directly cool the blower.

Each of the aspects of the various embodiments may be employed with each of the embodiments discussed above. Certain of the embodiments discussed above may provide cooling of the vacuum source more quickly than with other embodiments discussed above.

Those skilled in the art will appreciate that numerous modifications and variations may be made to the above disclosed embodiments without departing from the spirit and scope of the present invention.

What is claimed is:

1. A method of processing objects comprising:
   providing a programmable motion device including an end effector with a vacuum cup that is coupled via a valve to a high flow vacuum source;
   providing a plurality of heterogenous objects to be grasped by the vacuum cup, each object being associated with a quality of a vacuum seal that the vacuum cup is known to form with the vacuum cup;
   actuating a valve disposed inline between a vacuum source and the vacuum cup to provide a vacuum at the vacuum cup; and
   selecting a sequence of the plurality of heterogenous objects to be grasped by the end effector based on the quality of the vacuum seal formed between the vacuum cup and each of the plurality of heterogenous objects such that objects known to form a good seal with the vacuum cup are not chosen for processing successively.

2. The method as claimed in claim 1, wherein the method further includes estimating a temperature of the high flow vacuum source.

3. The method as claimed in claim 2, wherein the estimating a temperature of the high flow source is responsive to recent history of pressure, flow and vacuum source control signals as well as valve control signals, in combination with knowledge of high flow vacuum source thermal properties.

4. The method as claimed in claim 1, wherein the method further includes limiting a period of time that a seal is formed with an object that is associated with a good seal.

5. The method as claimed in claim 1, wherein the method further includes requiring that the flow of air to the vacuum source occur for a minimum period of time between picking objects.

6. The method as claimed in claim 1, wherein the high flow vacuum source includes a side-channel blower.

7. The method as claimed in claim 1, wherein the valve is any of a linear valve or a rotary valve.

8. The method as claimed in claim 1, wherein the method further includes providing a relief valve for providing cooling fluid to the high flow vacuum source.

9. The method as claimed in claim 8, wherein the relief valve is coupled to a coolant source, where the relief valve is responsive to sensed pressure, flow, temperature or time.

10. The method as claimed in claim 1, wherein the method further includes providing via a sensor at the end effector any of flow sensor data, pressure sensor data, force sensor data and temperature sensor data.

11. A method of processing objects comprising:
providing a programmable motion device including an end effector with a vacuum cup that is coupled via a valve to a high flow vacuum source;
providing a plurality of heterogenous objects to be grasped by the vacuum cup, each object being associated with a quality of a vacuum seal that the vacuum cup is known to form with the vacuum cup;
actuating a valve disposed inline between a vacuum source and the vacuum cup to provide a vacuum at the vacuum cup;
choosing a first object of the plurality of heterogenous objects for processing with programmable motion device that is known to form a good seal with the vacuum cup; and
subsequently choosing a second object of the plurality of heterogenous objects for processing with the programmable motion device that is known to form a poor seal with the vacuum cup.

12. The method as claimed in claim 11, wherein the method further includes estimating a temperature of the high flow vacuum source.

13. The method as claimed in claim 12, wherein the estimating a temperature of the high flow source is responsive to recent history of pressure, flow and vacuum source control signals as well as valve control signals, in combination with knowledge of high flow vacuum source thermal properties.

14. The method as claimed in claim 11, wherein the method further includes limiting a period of time that a seal is formed with an object that is associated with a good seal.

15. The method as claimed in claim 11, wherein the method further includes requiring that the flow of air to the vacuum source occur for a minimum period of time between picking objects.

16. The method as claimed in claim 11, wherein the high flow vacuum source includes a side-channel blower.

17. The method as claimed in claim 11, wherein the valve is any of a linear valve or a rotary valve.

18. The method as claimed in claim 11, wherein the method further includes providing a relief valve for providing cooling fluid to the high flow vacuum source.

19. The method as claimed in claim 18, wherein the relief valve is coupled to a coolant source, where the relief valve is responsive to sensed pressure, flow, temperature or time.

20. The method as claimed in claim 11, wherein the method further includes providing via a sensor at the end effector any of flow sensor data, pressure sensor data, force sensor data and temperature sensor data.

21. An object processing system comprising:
a programmable motion device including an end effector with a vacuum cup that is coupled via a valve to a high flow vacuum source;
a plurality of heterogenous objects to be grasped by the vacuum cup, each object being associated with a quality of a vacuum seal that the vacuum cup is known to form with the vacuum cup;
a valve disposed inline between a vacuum source and the vacuum cup to provide a vacuum at the vacuum cup; and
a control system for reducing effects of dead-heading on the high flow vacuum source by selecting a sequence of the plurality of heterogenous objects to be grasped by the end effector based on the quality of the vacuum seal formed between the vacuum cup and each of the plurality of heterogenous objects such that objects known to form a good seal with the vacuum cup are not chosen for processing successively.

22. The object processing system as claimed in claim 21, wherein the control system further estimates a temperature of the high flow vacuum source.

23. The object processing system as claimed in claim 22, wherein the temperature of the high flow source is estimated responsive to recent history of pressure, flow and vacuum source control signals as well as valve control signals, in combination with knowledge of high flow vacuum source thermal properties.

24. The object processing system as claimed in claim 21, wherein the control system further limits a period of time that a seal is formed with an object that is associated with a good seal.

25. The object processing system as claimed in claim 21, wherein the control system further requires that the flow of air to the vacuum source occur for a minimum period of time between picking objects.

26. The object processing system as claimed in claim 21, wherein the high flow vacuum source includes a side-channel blower.

27. The object processing system as claimed in claim 21, wherein the valve is any of a linear valve or a rotary valve.

28. The object processing system as claimed in claim 21, wherein the system further includes a relief valve for providing cooling fluid to the high flow vacuum source.

29. The object processing system as claimed in claim 28, wherein the relief valve is coupled to a coolant source, where the relief valve is responsive to sensed pressure, flow, temperature or time.

30. The object processing system as claimed in claim 21, wherein the system further includes a sensor at the end effector for providing any of flow sensor data, pressure sensor data, force sensor data and temperature sensor data.

* * * * *